United States Patent [19]

Iwasaki et al.

[11] Patent Number: 5,439,754
[45] Date of Patent: Aug. 8, 1995

[54] FERROMAGNETIC FILM, METHOD OF MANUFACTURING THE SAME, AND MAGNETIC HEAD

[75] Inventors: Hitoshi Iwasaki, Yokohama; Reiko Akashi, Sagamihara, both of Japan

[73] Assignee: Kabushiki Kaisha Toshiba, Kawasaki, Japan

[21] Appl. No.: 860,221

[22] Filed: Mar. 27, 1992

Related U.S. Application Data

[63] Continuation-in-part of Ser. No. 726,198, Jul. 5, 1991, abandoned.

[30] Foreign Application Priority Data

Jul. 5, 1990 [JP] Japan .................. 2-176319
Mar. 29, 1991 [JP] Japan .................. 3-066383
Sep. 12, 1991 [JP] Japan .................. 3-232853

[51] Int. Cl.⁶ ............................. H01F 10/16
[52] U.S. Cl. ..................... 428/692; 428/698; 428/900; 360/126
[58] Field of Search ............... 428/692, 698, 900; 360/122, 126

[56] References Cited

U.S. PATENT DOCUMENTS 4,231,816 11/1980 Cuomo et al. .............. 428/450
4,623,408 11/1986 Karamon et al. ............ 420/121
4,904,543 2/1990 Sakakima et al. ........... 428/610

FOREIGN PATENT DOCUMENTS 286124 10/1988 European Pat. Off. .
2152209 8/1990 Japan .

OTHER PUBLICATIONS

Webster's New World Dictionary, 3d College Ed. 1988, p. 872.
J. App. Phys. vol. 67, No. 9, pp. 5120–5122, May 1, 1990, H. Iwasaki, "Soft Magnetic Properties of Sputtered Co-Fe Films".
English Abstract of JP-63-64313, Mar. 22, 1988, Osamu Ishikawa, et al., "Magnetically Soft Thin Film".
IEEE Transactions on Magnetics, vol. 26 (5); Sep. 1990; K. Katori et al; "Soft Magnetic Properties for Fe-Al-Nb-N-O Films"; pp. 1497–1499.

*Primary Examiner*—Paul J. Thibodeau
*Assistant Examiner*—R. Follett
*Attorney, Agent, or Firm*—Oblon, Spivak, McClelland, Maier, & Neustadt

[57] ABSTRACT

Disclosed is a ferromagnetic film consisting of an alloy represented by the formula $(Co_xFe_yT_z)_aN_b$ (wherein T represents at least one type of an atom selected from the group consisting of Al, B, Si, Ga, and Ge, x, y, and z represent at % and satisfy $66<x<94$, $5<y\leq24$, $1<z<10$, and $x+y+z=100$, and a and b represent at % and satisfy $85<a<99$, $1<b<15$, and $a+b=100$), being crystalline, and having a crystal structure at least partially consisting of an fcc phase.

6 Claims, 15 Drawing Sheets

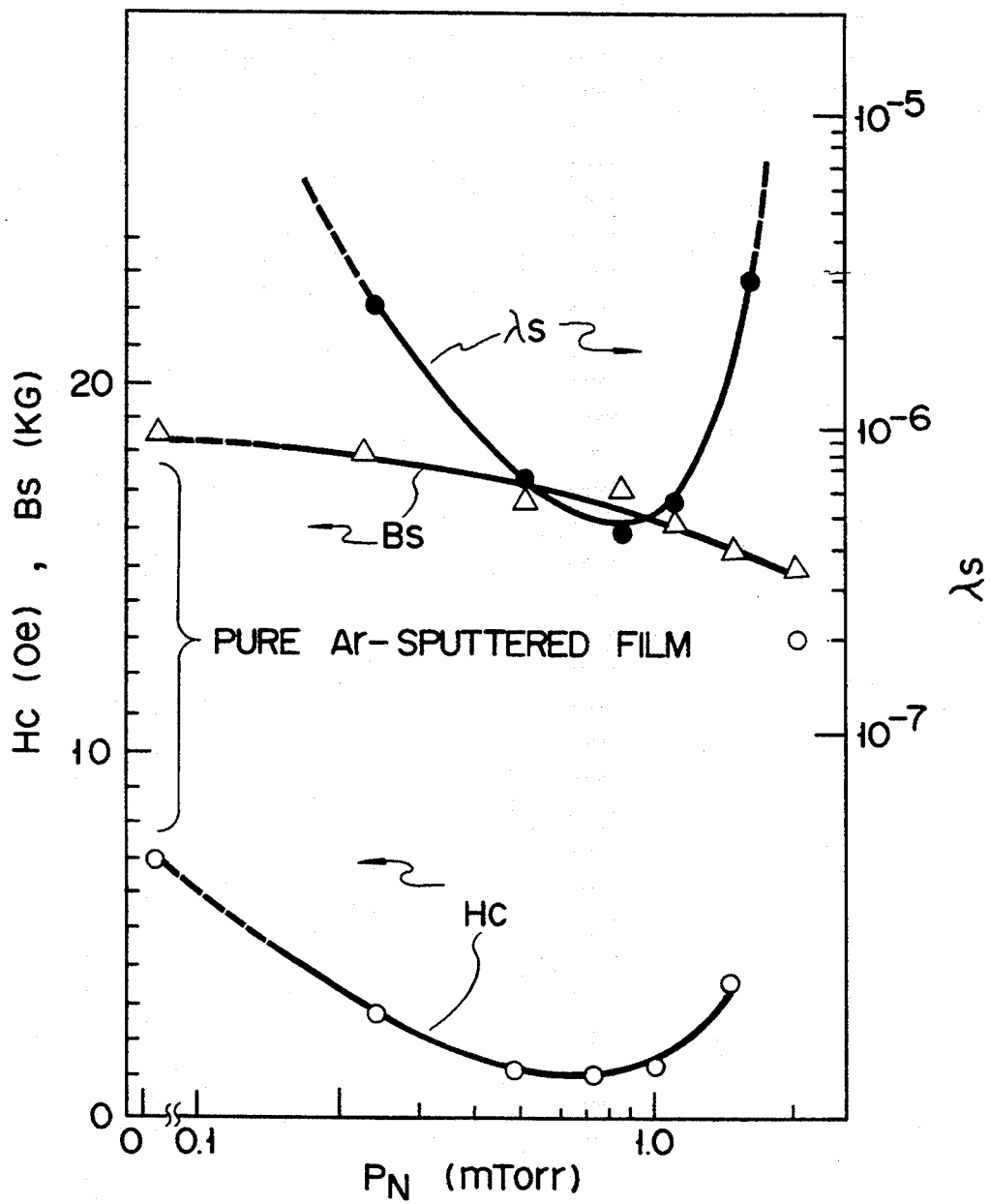
F I G. 1

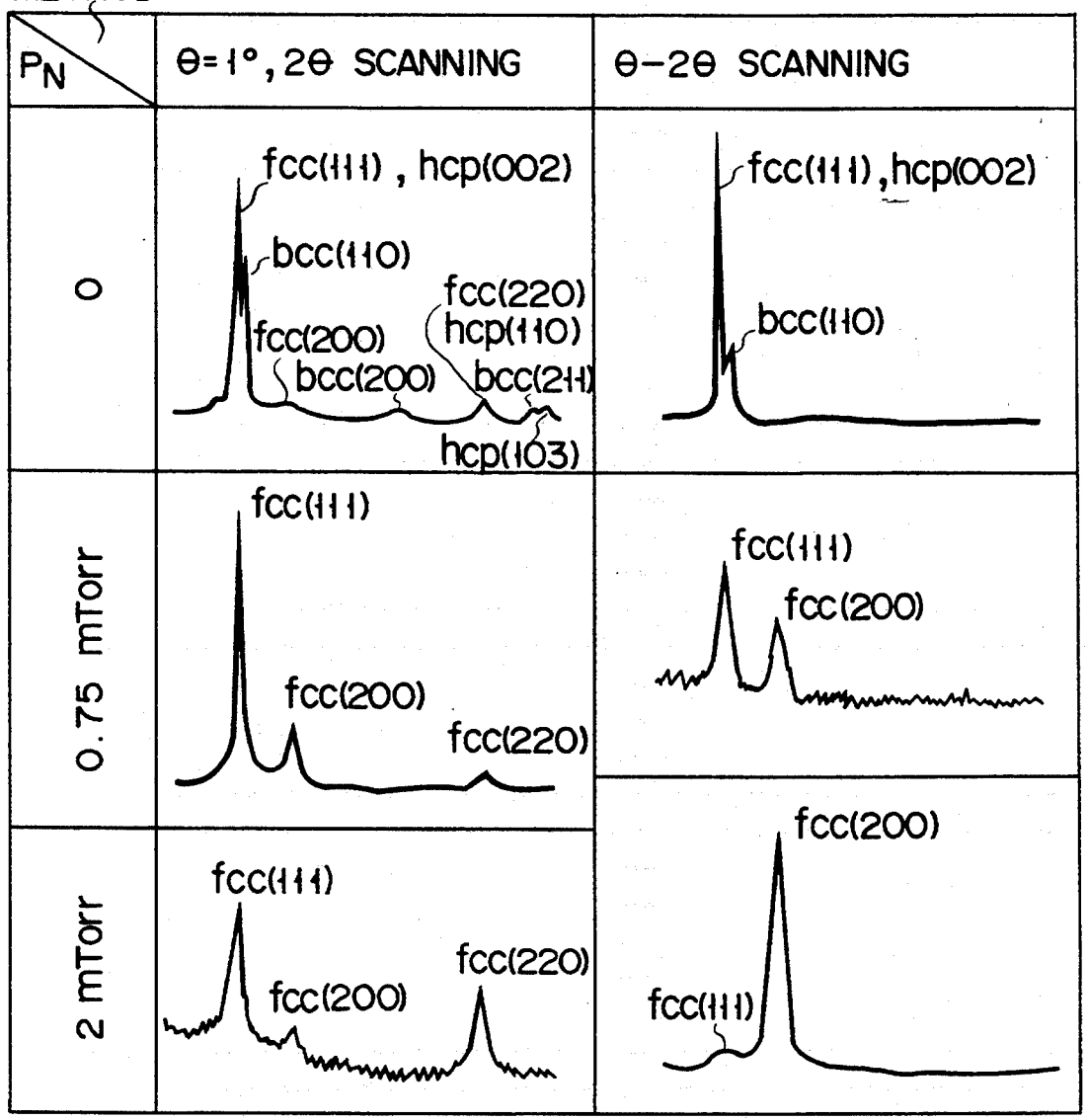
F I G. 3

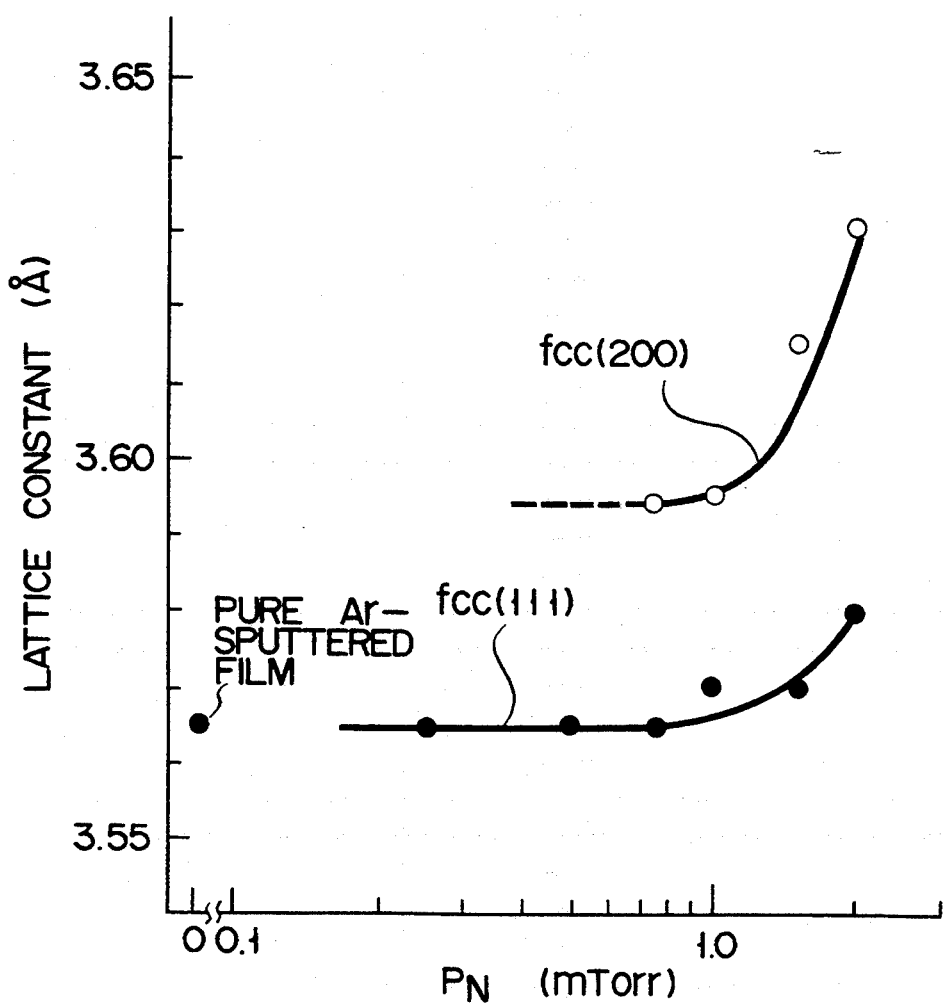
F I G. 4

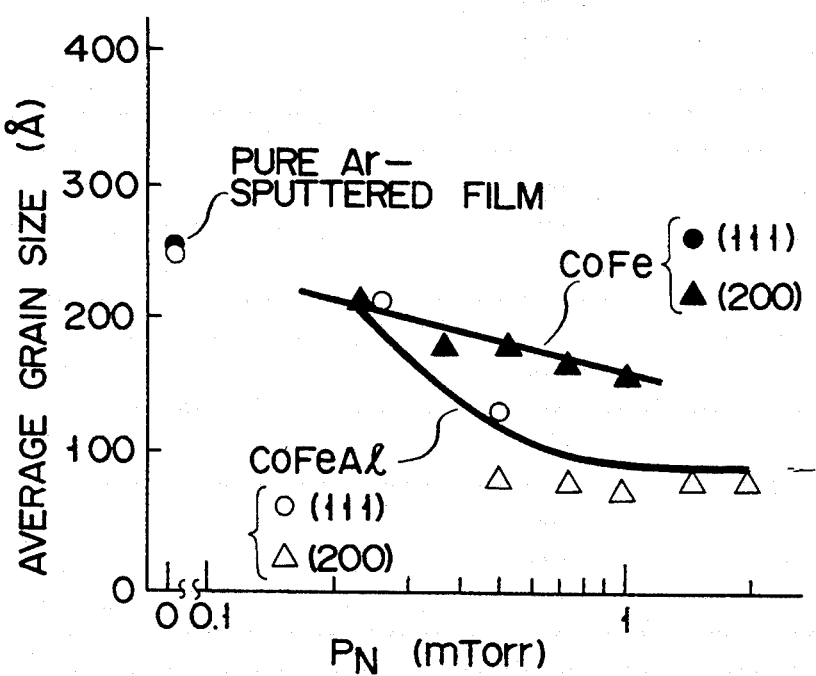
F I G. 5
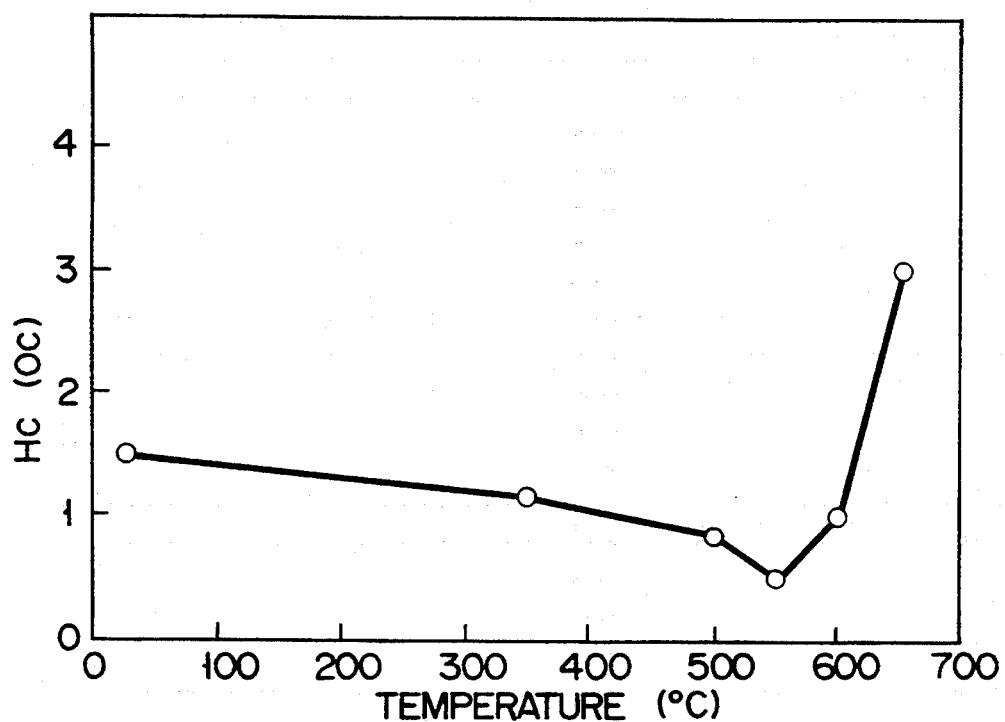
F I G. 6

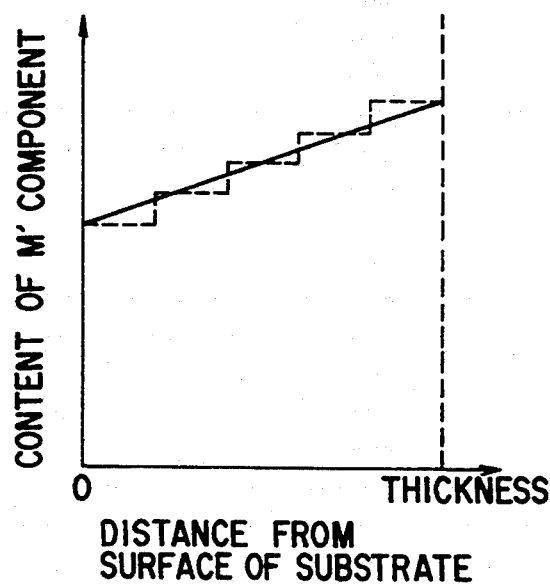
F I G. 13A
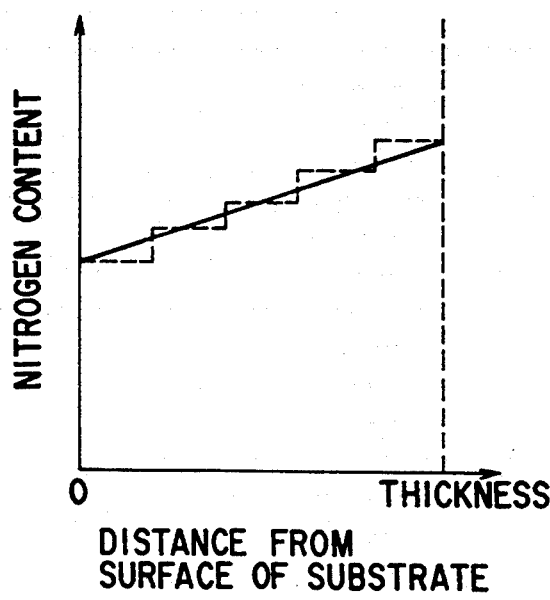
F I G. 13B

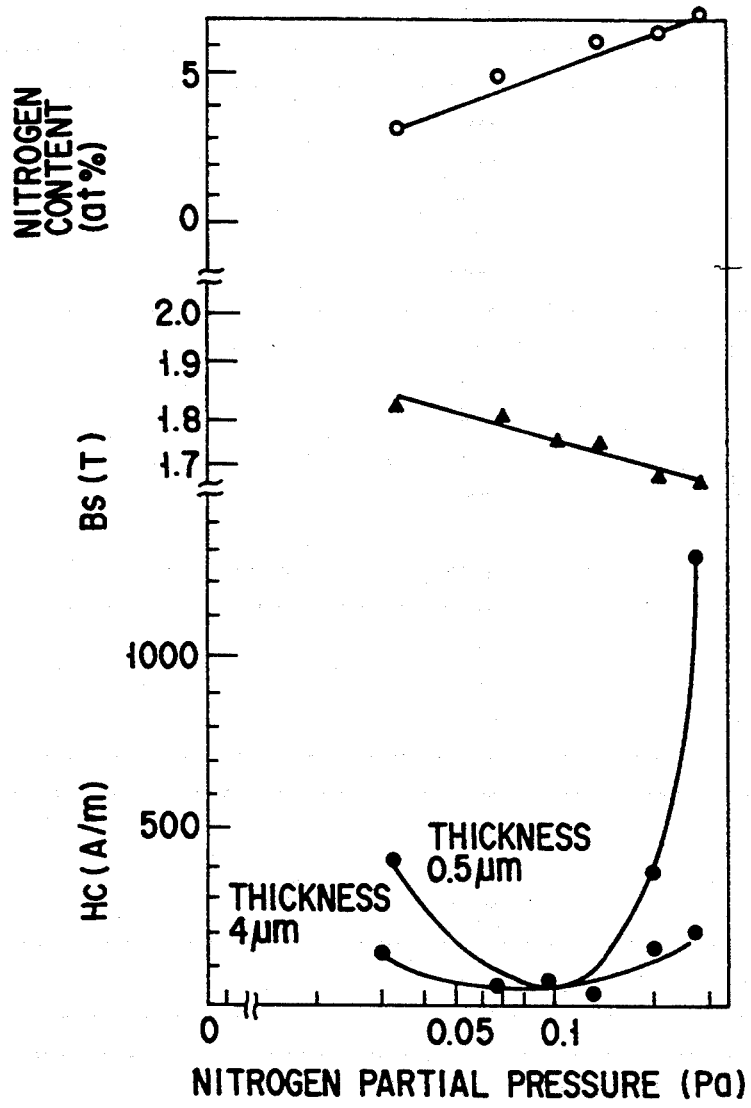
F I G. 15

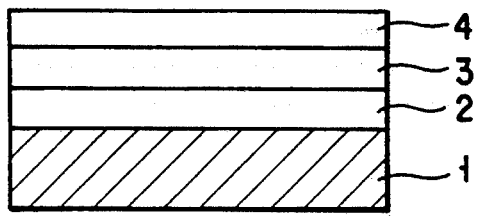
F I G. 19
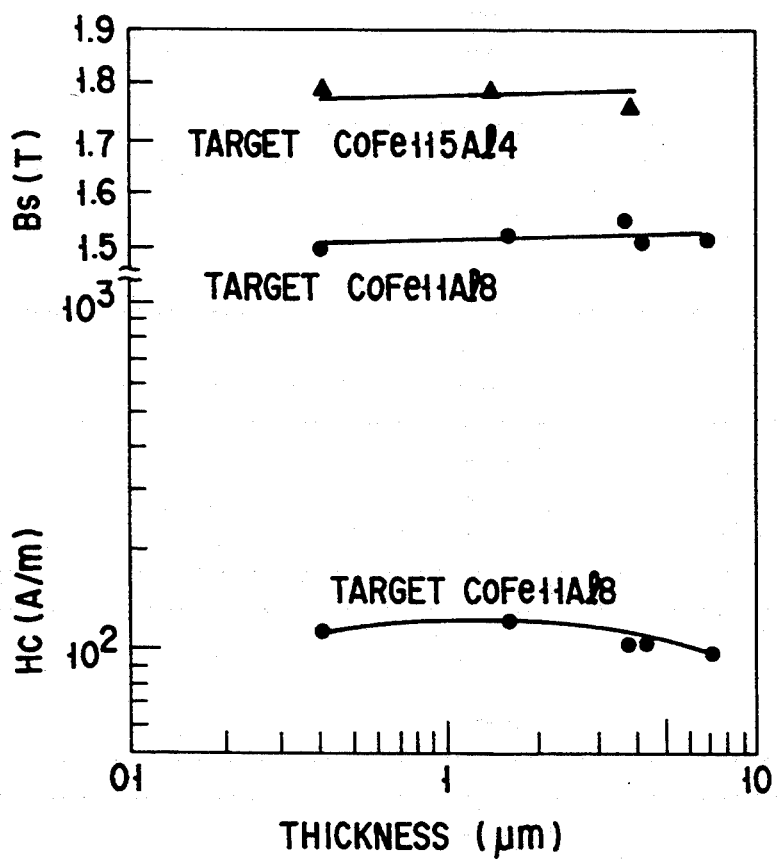
F I G. 18

FERROMAGNETIC FILM, METHOD OF MANUFACTURING THE SAME, AND MAGNETIC HEAD

This application is a continuation-in-part of application Ser. No. 07/726,198, filed on Jul. 5, 1991, now abandoned.

BACKGROUND OF THE INVENTION

1. Field of the Invention

The present invention relates to a ferromagnetic film, a method of manufacturing the same, and a magnetic head using the ferromagnetic film.

2. Description of the Related Art

A magnetic film for a magnetic head in the future is required to have a high saturation magnetic flux density Bs and soft magnetic characteristics (a low coercive force Hc and a low magnetostriction λs) so as to exhibit sufficient recording ability for a medium having a high coercive force.

Conventionally, an NiFe alloy film and a Sendust (FeAlSi)-based alloy film are known as crystalline magnetic films having good soft magnetic characteristics. However, the Bs of such a magnetic film is maximumly 15 kG. Many Fe- or Co-based alloys exhibit low Hc upon being changed into amorphous alloys. However, maximum Bs of an amorphous alloy film is also 15 kG.

The present inventor has paid attention to a CoFe-based alloy having high Bs of 19 kG or more throughout a wide composition range and made studies on a method of imparting soft magnetic characteristics to a CoFe-based alloy film. As a result, the present inventor reported that, when an fcc-phase (100) orientation is realized by a nitrogen-added sputtering method, a magnetic film having a comparatively low Hc of about 3 Oe and a low magnetostriction of $+1 \times 10^{-6}$ or less can be obtained (J. Appl. Phys., 67(9), pp. 5120–5122 (1990)). It is also reported that a CoFe alloy having similar Hc and a magnetostriction of substantially O is obtained by a plating method.

When an application to a magnetic head is taken into consideration, however, the Hc must be decreased to be about 1 Oe or less which is substantially equal to that of an NiFe alloy film, a Sendust film, or amorphous films.

Further, in a magnetic film formed of a CoFe-based alloy or Fe-based alloy containing, for example, Al as a third element, when the amount of the third element is reduced to improve saturation magnetic flux density, it is confirmed that the coercive force of an initially formed portion of the film is deteriorated, though the average coercive force of the entire film is low. Accordingly, if such a magnetic film is used in a metal-in-gap (MIG) head, the initially formed portion having a deteriorated coercive force may serve as a pseudo-magnetic gap, thereby generating a ripple in the frequency characteristic of the output of the head, so that good reproduction characteristics cannot be obtained.

On the other hand, in a magnetic film formed of a CoFe-based alloy containing a transition metal as a third element to serve to render the alloy amorphous, growth of crystal grains is caused due to the raise of the substrate temperature in the later stage of film formation by sputtering, resulting in a deterioration in the coercive force of the film.

SUMMARY OF THE INVENTION

It is an object of the present invention to provide a ferromagnetic film which has high Bs, low Hc, and low λs and can be suitably used as, e.g., a magnetic head.

It is another object of the present invention to provide a method of manufacturing the ferromagnetic film with ease.

It is still another object of the present invention to provide a magnetic head using the ferromagnetic film.

It is a further object of the present invention to provide a ferromagnetic film having an initially formed portion and a later formed portion, both of which are not deteriorated.

A ferromagnetic film of the present invention consists of an alloy represented by the formula $$(Co_xFe_yT_z)_aN_b$$

(wherein T represents at least one type of an atom selected from the group consisting of Al, B, Si, Ga, and Ge, x, y, and z represent at % and satisfy $66<x<94$, $5<y\leq24$, $1<z<10$, and $x+y+z=100$, and a and b represent at % and satisfy $85<a<99$, $1<b<15$, and $a+b=100$), and has a crystal structure at least partially consisting of an fcc phase.

A method of manufacturing a ferromagnetic film of the present invention comprises the step of sputtering a metal constituting an alloy represented by $$Co_xFe_yT_z$$

(wherein T, x, y, and z have the same meanings as defined above) on a substrate in a sputtering gas containing nitrogen.

A magnetic head of the present invention comprises a ferromagnetic film having the above composition, a coil electromagnetically coupled to the ferromagnetic film, and a layer for electrically insulating the ferromagnetic film from the coil.

According to another aspect of the present invention, there is provided a ferromagnetic film consisting of an alloy represented by the formula MM'N (wherein M represents at least one selected from the group consisting of Co and Fe, M' represents at least one selected from the group consisting of B, Al, Si, Ga, Ge, Ti, Zr, Hf, Nb, Ta, Mo, and W, and N represents nitrogen), wherein the content of M' and/or N is relatively high on the side of one surface thereof.

The ferromagnetic film of the present invention maintains high Bs of more than 15 kG and exhibits low Hc of 1 Oe or less and low λs of $2\times10^{-6}$ or less. Therefore, a magnetic head having a high recording capacity can be manufactured by using the ferromagnetic film of the present invention. In addition, since the ferromagnetic film of the present invention has a heat resistance of 500° C. or more, the ferromagnetic film can be applied to a wide variety of heads including a head requiring a glass welding step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a graph showing a nitrogen partial pressure dependency of magnetic characteristics of a ferromagnetic film according to the present invention;

FIG. 3 is a graph showing a nitrogen partial pressure dependency of an X-ray diffraction curve of the ferromagnetic film according to the present invention;

FIG. 4 is a graph showing a nitrogen partial pressure dependency of a lattice constant of the ferromagnetic film according to the present invention;

FIG. 5 is a graph showing a nitrogen partial pressure dependency of an average grain size of the ferromagnetic film according to the present invention;

FIG. 6 is a graph showing a heat treatment temperature dependency of Hc of the ferromagnetic film according to the present invention;

FIG. 13A is a graph showing the relationship between the content of an M' component in the ferromagnetic film of the present invention and the distance from the surface of the substrate; FIG. 13B is a graph showing the relationship between the nitrogen content in the ferromagnetic film of the present invention and the distance from the surface of the substrate;

FIG. 15 is a graph showing nitrogen partial pressure dependency of the coercive force Hc, saturation magnetic flux density Bs, and Al content of the ferromagnetic film formed in Example 7;

FIG. 18 is a graph showing a thickness dependency of the coercive force Hc and the saturation magnetic flux density Bs of the ferromagnetic film formed by sputtering $CoFe_{11}Al_8$ or $CoFe_{11.5}Al_4$ in Example 9;

FIG. 19 is a cross sectional view showing the structure of a laminated ferromagnetic film according to the present invention;

DETAILED DESCRIPTION OF THE PREFERRED EMBODIMENTS

Figure 2:
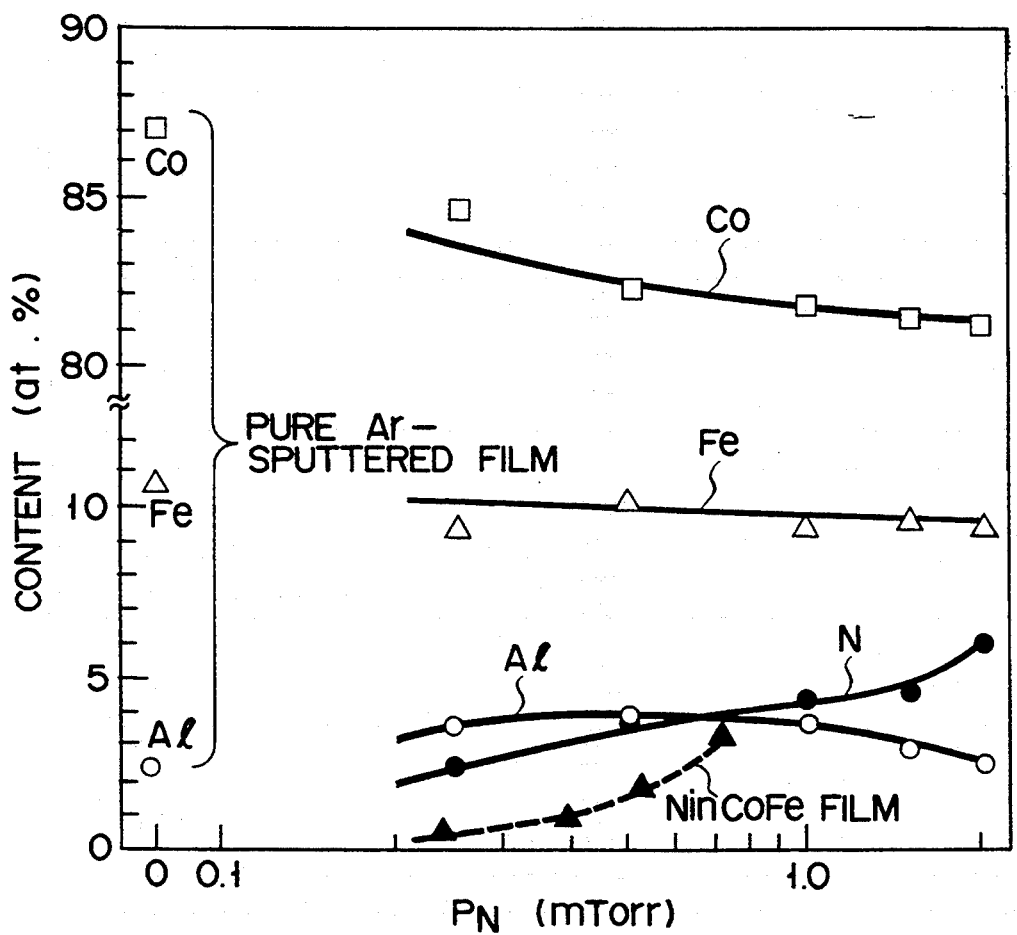
FIG. 2 is a nitrogen partial pressure dependency of a composition of the ferromagnetic film according to the present invention.

A ferromagnetic film of the present invention consists of a Co-rich Fe alloy and is crystalline. The crystal structure of the film at least partially has an fcc phase, and the fcc phase is preferably a main phase. Reasons for limiting the composition of the ferromagnetic film of the present invention will be described below.

A content x (at %) of Co is limited as $66 < x < 94$ and a content y (at %) of Fe is limited as $5 < y \leq 24$ for the following reason. That is, if the content of Fe is 5 at % or less, an hcp phase is contained in the film to increase Hc. If the content of Fe exceeds 24 at %, high Bs and low Hc can be obtained. However, λs is increased because a bcc phase is contained in the film. If the content of Fe is 5 to 24 at %, an fcc single phase or two phases of an fcc phase in which (100) faces are oriented perpendicularly to the film surface and a bcc phase can be obtained. As a result, the film exhibits a low magnetostriction of $2 \times 10^{-6}$ or less. Note that since the bcc phase becomes easy to generate if the content of Fe exceeds 16 at %, an undercoating layer consisting of, e.g., MgO is preferably formed to preferentially grow the fcc phase. Therefore, the content y of Fe is more preferably $5 < y \leq 16$.

A content z (at %) of T, i.e., at least one type of an atom selected from the group consisting of Al, B, Si, Ga, and Ge is limited as $1 < z < 10$ for the following reason. If the content of T is 1 at % or less, Hc is increased. If the content of T exceeds 10 at %, Bs is decreased and Hc is increased. If the content of T is 1 to 10 at %, the film exhibits high Bs of 15 to 19 kG and low Hc of 1 Oe or less. The content z of T is more preferably $3 \leq z < 10$.

A content b of nitrogen is limited as $1 < b < 15$ for the following reason. If the content of N is 1 at % or less, the grain size is increased to increase Hc. If the content of N exceeds 15 at %, the lattice constant is increased to increase λs. If the content of N is 1 to 15 at %, the content of N is suppressed to be less than 1.5 times that of T. As a result, an increase in lattice constant can be suppressed to realize low Hc of 1 Oe or less and low λs of $2 \times 10^{-6}$ or less. A ratio of z to b is preferably 1:0.5 to 1.5.

The ferromagnetic film of the present invention having the above composition has a heat resistance of 500° C. or more.

The ferromagnetic film of the present invention can be manufactured by performing reactive sputtering (nitrogen-added sputtering) for metals constituting a CoFeT-based alloy in a gas mixture atmosphere consisting of argon and nitrogen. In this case, the ferromagnetic film having the above composition can be manufactured by controlling the nitrogen partial pressure in the atmosphere. In addition, soft magnetic characteristics of the film can be improved as needed by performing a heat treatment after film formation.

A sputtering method using a composite target of a CoFe alloy and AlN; a method of radiating nitrogen ions on a substrate during various sputtering or vapor deposition processes; and the like can be adopted as well as the above method. Note that small amounts of oxygen and argon are naturally contained in a film formed by sputtering.

The ferromagnetic film of the present invention can be applied to a thin film magnetic head of either a longitudinal or vertical recording type. Since the ferromagnetic film has high Bs, low Hc, and low λs, high-density recording is realized. In addition, since the ferromagnetic film of the present invention has a heat resistance of 500° C. or more, the film can be applied to a metal-in-gap head manufactured by a method including a glass welding step.

A ferromagnetic film will be explained which is represented by a formula MM'N (wherein M represents at least one transition metal selected from the group consisting of Co and Fe, M' represents at least one selected from the group consisting of B, Al, Si, Ga, Ge, Ti, Zr, Hf, Nb, Ta, Mo, and W, and N represents nitrogen), wherein the content of M' and/or N is relatively high on the side of one surface thereof.

Figure 12A:
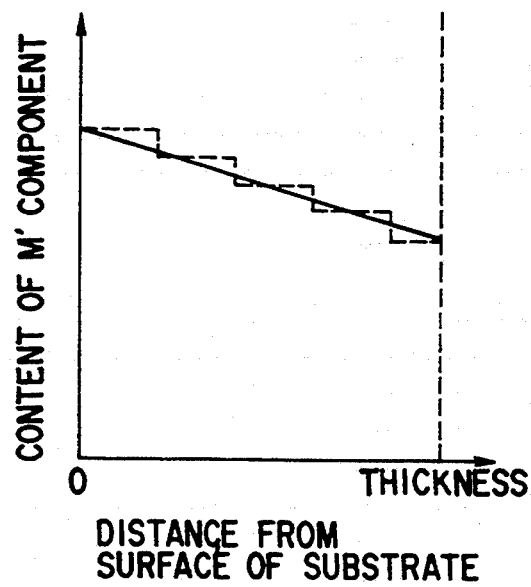
FIG. 12A is a graph showing the relationship between the content of an M' component in the ferromagnetic film of the present invention and the distance from the surface of the substrate.
Figure 12B:
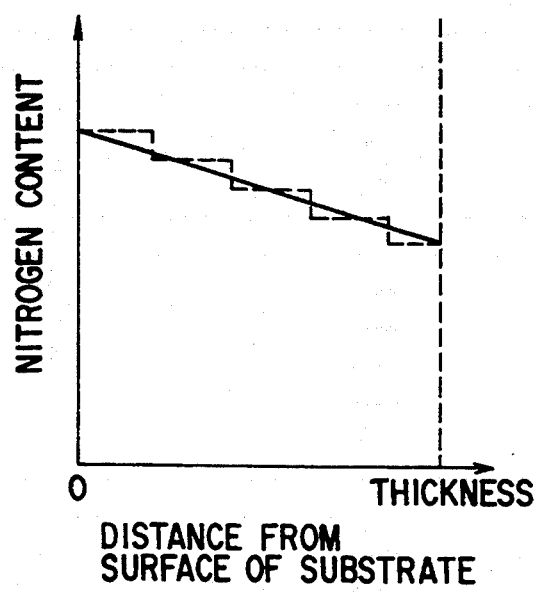
FIG. 12B is a graph showing the relationship between the nitrogen content in the ferromagnetic film of the present invention and the distance from the surface of the substrate.

FIGS. 12A and 12B show a constitution in which the closer to the substrate a portion of the film is located, the higher the content of the M' component or nitrogen in the portion, or the closer to the outer surface the portion is located, the lower the content thereof. The ferromagnetic film applied this constitution contains, as the M' component, at least one selected from the group consisting of Al and Ga. The content of the M' component and/or nitrogen may be varied continuously in the thickness direction as indicated by the solid line in FIGS. 12A or 12B, or may be varied discontinuously as indicated by the broken line. In either case, the same effect can be obtained. That is, it will suffice if the content of the M' component and/or nitrogen is relatively high on the substrate side.

In the above constitution, deterioration of the soft magnetic characteristics in the portion of the ferromagnetic film which locates nearby the substrate can be restrained, and also a reduction in the saturation magnetic flux density of a finally obtained ferromagnetic film can be minimized. As a result, if the ferromagnetic film is applied to, for example, an MIG head, a pseudo-magnetic gap between the substrate and ferromagnetic film can be reduced, and hence a ripple in the frequency characteristic can be minimized.

The above-described ferromagnetic film is produced in the following manner. That is, in the nitrogen-added sputtering process described above, (a) a target is used in the initial stage of the sputtering which contains higher M' component than that used in the later stage, or alternatively, (b) a sputtering condition is employed which enables the content of the M' component and/or nitrogen to be higher in the initial stage than in the later stage.

FIGS. 13A and 13B show a constitution in which the closer to the substrate a portion of the film is located, the lower the content of the M' component or nitrogen contained in the portion, or the closer to the outer surface the portion is located, the higher the content thereof. The ferromagnetic film having this constitution contains, as the M' component, at least one selected from the group consisting of materials other than Al and Ga, i.e., consisting of B, Si, Ge, Ti, Zr, Hf, Nb, Ta, Mo, and W. The content of the M' component and/or nitrogen may be varied continuously in the thickness direction as indicated by the solid line in FIGS. 13A or 13B, or may be varied discontinuously as indicated by the broken line. In either case, the same effect can be obtained. That is, it will suffice if the content of the M' component and/or nitrogen is relatively high on the side of the outer surface.

In the above constitution, an increase in Hc due to growth of crystal grains in the later stage of film formation can be restrained, and also a reduction in the saturation magnetic flux density of a finally obtained ferromagnetic film can be minimized.

The above-described ferromagnetic film is produced in a manner reverse to the aforementioned one. That is, (a) a target is used in the initial stage of the sputtering, which contains lower M' component than that used in the later stage, or alternatively, (b) a sputtering condition is employed which enables the content of the M' component and/or nitrogen to be lower in the initial stage than in the later stage.

EXAMPLE 1

A Co-11.5 at % Fe-4 at %Al alloy target was used to form a magnetic film having a film thickness of 0.3 μm on a glass substrate (a 0211 substrate available from Corning Glass Works) by a bipolar RF sputtering apparatus while the content of nitrogen gas contained in argon gas was changed. The sputtering conditions were as follows.

RF current density: 5 W/cm$^2$
Total sputtering gas pressure: $1 \times 10^{-2}$ Torr
Nitrogen gas partial pressure: $0 - 2 \times 10^{-3}$ Torr
Interelectrode distance: 40 mm
Preliminary vacuum pressure: $1 \times 10^{-6}$ Torr The physical properties and magnetic characteristics of the obtained magnetic film were measured as follows. The coercive force was measured by applying a magnetic field of a maximum of 250 Oe in the direction of the hard axis of magnetization of a magnetic film. The magnetostriction was calculated from a relationship between a unidirectional stress applied to the substrate and an anisotropic magnetic field Hk. The crystal structure was checked by an x-ray diffractometry (using CuKα rays) of θ-2θ scanning. The average grain size was calculated from a half-width of an X-ray diffraction curve. The nitrogen content in the film was checked by a steam distillation and Nessler absorption spectrophotometry. The contents of Co, Fe, and Al in the film were checked by ICP emission analysis.

FIG. 1 shows a nitrogen partial pressure (abbreviated to $P_N$ hereinafter) dependency of the magnetic characteristics of the magnetic film, i.e., a coercive force Hc, saturation magnetization Bs, and a magnetostriction λs. FIG. 1 reveals the following findings. That is, although a magnetic film formed in pure argon has high Bs, it is difficult to apply the film to a magnetic head because its Hc is high. Even when the $P_N$ is increased, the Bs of the obtained magnetic film is not changed much but maintained at a high level. Within the $P_N$ range of 0.1 to about 1 mTorr, the Hc and λs of the magnetic film are decreased as the $P_N$ is increased. A magnetic film obtained within the $P_N$ range of 0.5 to about 1 mTorr has good soft magnetic characteristics, i.e., high Bs of 17 to 18 kG, low Hc of about 1.5 Oe, and low λs of +0.5 to $0.7 \times 10^{-6}$. When the $P_N$ is about 1 mTorr or more, however, the Hc and λs of the magnetic film are increased as the $P_N$ is increased. For example, when the $P_N$ is 1.5 mTorr or more, no magnetic film having low Hc and low λs can be obtained.

The magnetic characteristics of the magnetic film depend on the composition, the crystal layer, the lattice constant, and the average grain size of the magnetic film as will be described below.

FIG. 2 shows a relationship between the $P_N$ and the composition of the formed magnetic film. For comparison, FIG. 2 also shows a nitrogen content obtained when a CoFe-based alloy film was formed by nitrogen-added sputtering. FIG. 2 reveals the following findings. As the $P_N$ is increased, the nitrogen content is monotonously increased. The nitrogen content in the CoFeAl-based alloy film according to the present invention is higher than that in the CoFe-based alloy film. As the $P_N$ is increased, the contents of Co and Fe are slightly decreased. In addition, as the $P_N$ is increased, the Al content is slightly increased and then decreased. It is assumed that the change in composition as shown in FIG. 2 is caused for the following reason. That is, since the bonding force of Al with respect to nitrogen is stronger than that of Co or Fe, AlN is formed as the $P_N$ is increased. Since this AlN is difficult to sputter, resputtering of nitrogen or Al from the substrate is suppressed. It is assumed that such a phenomenon is caused within the $P_N$ range of 0.1 to about 0.7 mTorr. On the other hand, when the $P_N$ is increased to be about 0.7 mTorr or more, the Al content is decreased though the nitrogen content is increased. This means that the amount of nitrogen not bonded with Al is increased. As a result, when the $P_N$ is, e.g., 1.5 mTorr, the nitrogen content (at %) is 1.5 times the Al content. The change in composition of the magnetic film as described above substantially corresponds to the change in magnetic characteristics of the magnetic film shown in FIG. 1.

The following finding is obtained about a relationship between the crystal phase and λs of a CoFe-based alloy film (J. Appl. Phys., 67(9), pp. 5120–5122 (1990)). That is, a structure mainly having a bcc phase exhibits high positive λs. When nitrogen-added sputtering is performed at proper $P_N$, λs of a magnetic film is decreased because an fcc phase in which (100) faces are oriented perpendicularly to the film surface is mixed in the bcc phase. However, when the nitrogen content in the film is further increased to increase the lattice constant of the fcc phase, a large λs value is obtained even in the fcc (100)-oriented film.

On the basis of the above finding, the crystal structure and the lattice constant of the CoFeAl-based alloy film according to the present invention were checked. FIG. 3 shows results of checking a relationship between $P_N$ and an x-ray diffraction curve (a $\theta = 1°$-fixed $2\theta$ scanning method and a $\theta$–$2\theta$ scanning method). FIG. 4 shows results of checking $P_N$ dependency of a lattice constant.

The results shown in FIG. 3 reveal the following findings. That is, specific diffraction peaks of fcc, bcp, and bcc phases are detected in a pure argon sputtered film, i.e., the film has a crystal structure in which these three phases are simultaneously present. When the $P_N$ is increased, only a diffraction peak of the fcc phase is detected. From these findings, it is understood that the fcc phase is stabilized by nitrogen-added sputtering as is the case with the CoFe-based alloy film. It is assumed that low λs was obtained when the $P_N$ was 0.5 to 1 mTorr in FIG. 2 because the crystal structure of the magnetic film is changed into a structure mainly having the fcc phase.

The results shown in FIG. 4 reveal the following findings. That is, a lattice constant obtained from (200) reflection has a value larger than that of a lattice constant obtained from (111) reflection. The reason for this finding is assumed to be that nitrogen atoms are preferentially contained in crystal grains corresponding to the (200) reflection. No significant change is found in the lattice constant within a comparatively low $P_N$ range of about 1 mTorr. The range within which low Hc and low λs are obtained in FIG. 1 is included in the range within which no significant change is found in the lattice constant. However, when the $P_N$ is increased to be about 1 mTorr or more, the lattice constant is increased. For example, when the $P_N$ is 1.5 mTorr (i.e., in a magnetic film containing nitrogen atoms in an amount (at %) 1.5 times that of Al atoms as shown in FIG. 2), the lattice constant is very large. Within this range, Hc and λs are increased as shown in FIG. 1. Therefore, it is assumed that the increase in λs at high $P_N$ is caused by the increase in lattice constant.

FIG. 5 shows $P_N$ dependency of an average grain size calculated from each of the (111) and (200) peaks. For comparison, FIG. 5 also shows results of a CoFe-based alloy film formed by nitrogen-added sputtering. In the CoFe-based alloy film, the average grain size is decreased to be at most about 160 Å even when the $P_N$ is increased. In the CoFeAl-based alloy film, on the other hand, the average grain size is decreased to be about 100 Å as the $P_N$ is increased. It is assumed that Hc is decreased as shown in FIG. 1 partially because fine crystal grains are formed.

FIG. 6 shows how Hc of a magnetic film formed at $P_N$ of 0.5 to 1 mTorr and having low Hc and low λs changed, when a fixed magnetic field was applied in the direction of the easy axis of magnetization of the magnetic film and a heat treatment was performed at a predetermined temperature for one hour after film formation. As shown in FIG. 6, the Hc of the magnetic film according to the present invention is decreased to be 1 Oe or less by a heat treatment at about 550° C. Since the magnetic film of the present invention has a heat resistance even at 550° C., the film can be applied to a head (e.g., a metal-in-gap head) requiring a glass welding step.

It was confirmed that the above-mentioned characteristics were similarly obtained in a magnetic film having a thickness of 1 μm or more.

EXAMPLE 2

Magnetic films having a substantially fixed content ratio of Co to Fe and different Al contents and N contents were formed following the same procedures as in Example 1 except that a composite target in which an Al chip was placed on a CoFe alloy having a predetermined composition was used. Table 1 shows the characteristics of these magnetic films. The values of Hc shown in Table 1 were obtained when a heat treatment was performed at 550° C. for one hour after film formation, and Table 1 shows results of magnetic films obtained at $P_N$ at which the Hc was minimized. In each film, the N and Al contents represented by at % are substantially the same as in Example 1.

Table 1 reveals the following findings. When the Al content is decreased to be 1 at %, Hc is increased. On the other hand, when the Al content is increased to be 10 at %, Bs is decreased to be 14 kG or less to make it impossible to realize a film having Bs higher than that of a conventional crystalline magnetic film (NiFe film or FeAlSi film) or amorphous film. In addition, the Hc is also increased.

By setting an Al content z within the range of 1 at % $z < 10$ at %, high Bs of 15 kG or more, low Hc of 1 Oe or less, and low $\lambda s$ of $2 \times 10^{-6}$ or less can be realized.

EXAMPLE 3

Figure 7:
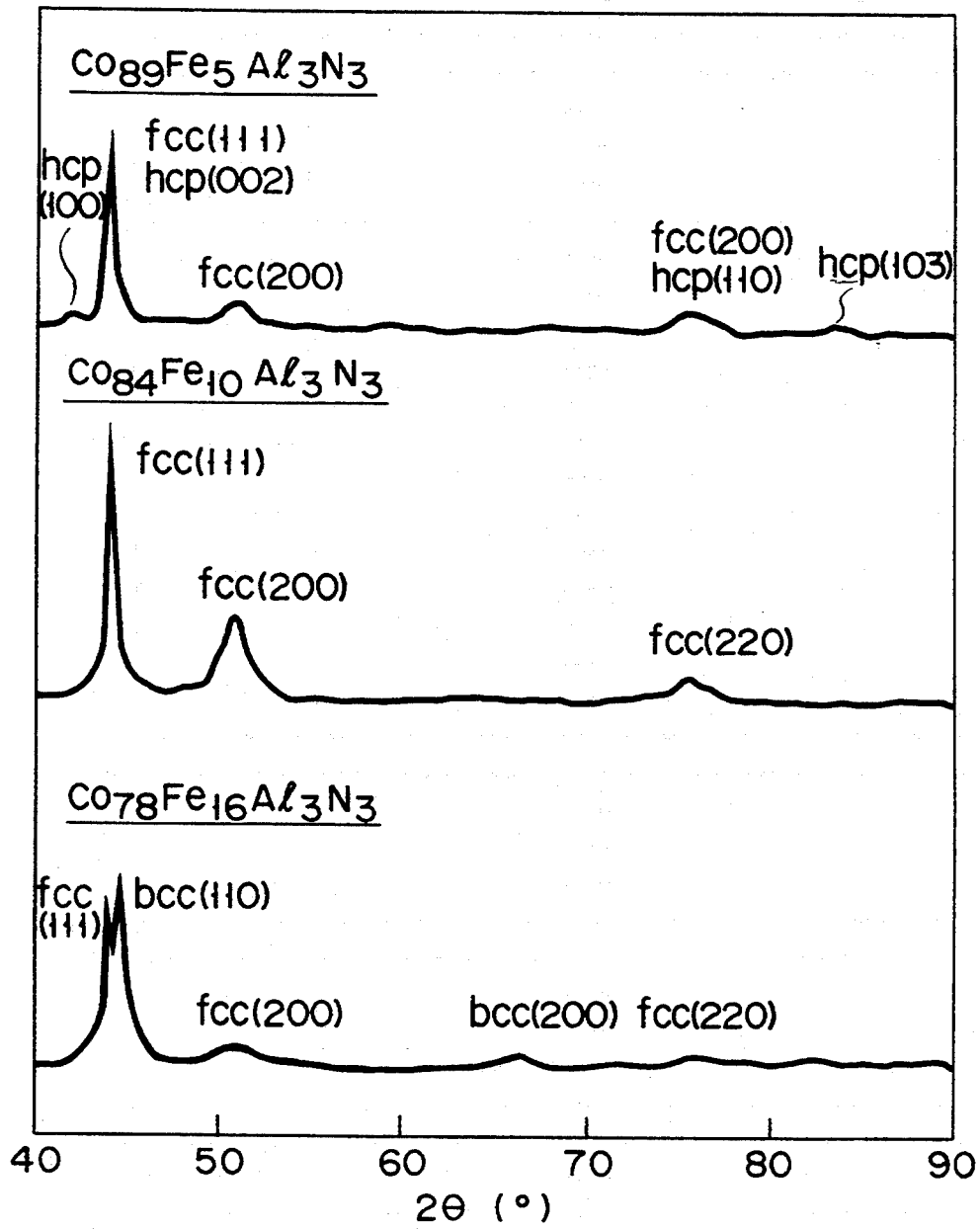
FIG. 7 is a graph showing an Fe content dependency of an X-ray diffraction curve of the ferromagnetic film according to the present invention.

Magnetic films were formed following the same procedures as in Example 1 except that the Al content was fixed while the Fe content was changed. Table 2 shows the magnetic characteristics of these magnetic films, and FIG. 7 shows their X-ray diffraction curves. Also in Table 2, the values of Hc were obtained when a heat treatment was performed at 550° C. for one hour after film formation, and results of magnetic films obtained at $P_N$ at which the Hc was minimized are shown.

The above results reveal the following findings. That is, when the Fe content is decreased to be 5 at %, Hc is increased to be 3 Oe or more as shown in Table 2, and hcp (100) reflection is found in an X-ray diffraction curve as shown in FIG. 7. The hcp phase of Co is known to have large crystal anisotropy. For this reason, it is assumed that the Hc is increased because the hcp phase is contained in the film to increase the crystal magnetic anisotropy. On the other hand, when the Fe content is increased to be 16 at %, Bs is increased, Hc is decreased to be 1 Oe or less, but $\lambda s$ is increased to be $7 \times 10^{-6}$, as shown in Table 2. In addition, as shown in FIG. 7, a clear bcc (110) peak is found in the X-ray diffraction curve. It is assumed that the $\lambda s$ is increased because the bcc phase is contained in the film.

EXAMPLE 4

Figure 8:
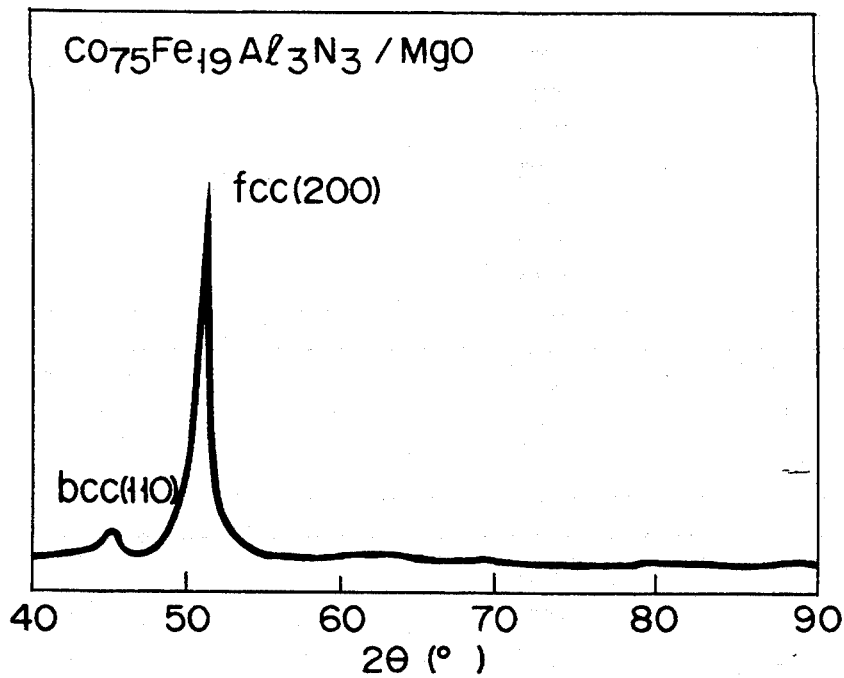
FIG. 8 is a graph showing an x-ray diffraction curve of a ferromagnetic film formed on an MgO under-coating layer according to the present invention.

After an MgO film (undercoating layer) was formed by sputtering on a glass substrate, a magnetic film was formed following the same procedures as in Example 1. In Example 4, it was found that low $\lambda s$ could be maintained even when the Fe content was increased to be higher than that in the magnetic film of Example 1. Table 3 shows the magnetic characteristics of these magnetic films, and FIG. 8 shows an X-ray diffraction curve thereof. Also in Table 3, the values of Hc were obtained when a heat treatment was performed at 550° C. for one hour after film formation, and results of magnetic films obtained at $P_N$ at which the Hc was minimized.

As shown in Table 3, by using MgO as the undercoating layer, low $\lambda s$ of $2 \times 10^{-6}$ or less is obtained even when the Fe content is increased to be 24 at %. As shown in FIG. 8, a high-intensity fcc (200) peak is found in the X-ray diffraction curve. This finding indicates that fcc (100) faces are preferentially grown perpendicularly to the film surface. It is known that, when fcc (100) faces are preferentially grown perpendicularly to the film surface of a CoFe-based alloy film, a magnetostriction of the film is decreased even if the film contains a bcc phase. Although the magnetic film according to the present invention contains the bcc phase in a composition region having a high Fe content, it is assumed that fcc (100) faces can be preferentially grown perpendicularly to the film surface by forming the MgO undercoating layer, thereby realizing low $\lambda s$.

EXAMPLE 5

In each of the above Examples, a CoFeAl alloy has been described. However, it is found that a magnetic film having high Bs, low Hc, and low $\lambda s$ can be obtained by substituting Al with B, Si, Ga, or Ge (under the same conditions as in Example 1). Table 4 shows results of some films. Also in Table 4, the values of Hc were obtained when a heat treatment was performed at 550° C. for one hour after film formation, and results of magnetic films obtained at $P_N$ at which the Hc was minimized.

TABLE 1

| Composition | $P_N$ (mTorr) | Hc (Oe) | $\lambda s$ ($\times 10^6$) | Bs (kG) |
|---|---|---|---|---|
| $Co_{88}Fe_{10}Al_1N_1$ | 0.15 | 6 | — | 19.0 |
| $Co_{85}Fe_9Al_3N_3$ | 0.75 | 0.7 | +0.5 | 17.5 |
| $Co_{81}Fe_9Al_5N_5$ | 1.20 | 0.5 | +0.4 | 16.0 |
| $Co_{77}Fe_9Al_7N_7$ | 1.75 | 0.9 | +1.0 | 15.0 |
| $Co_{72}Fe_8Al_{10}N_{10}$ | 3.20 | −3.0 | — | 13.5 |

TABLE 2

| Composition | $P_N$ (mTorr) | Hc (Oe) | $\lambda s$ ($\times 10^6$) | Bs (kG) |
|---|---|---|---|---|
| $Co_{89}Fe_5Al_3N_3$ | 0.50 | 3 | — | 15.0 |
| $Co_{86}Fe_8Al_3N_3$ | 0.75 | 0.9 | −0.9 | 16.0 |
| $Co_{84}Fe_{10}Al_3N_3$ | 0.75 | 0.7 | +0.5 | 17.5 |
| $Co_{81}Fe_{13}Al_3N_3$ | 1.00 | 0.6 | +2.0 | 18.0 |
| $Co_{78}Fe_{16}Al_3ON_3$ | 0.75 | 0.6 | +7.0 | 18.5 |

TABLE 3

| Composition | $P_N$ (mTorr) | Hc (Oe) | $\lambda s$ ($\times 10^6$) | Bs (kG) |
|---|---|---|---|---|
| $Co_{78}Fe_{16}Al_3N_3$ | 1.00 | 0.7 | +0.8 | 18.0 |
| $Co_{75}Fe_{19}Al_3N_3$ | 1.00 | 0.6 | +1.0 | 18.0 |
| $Co_{70}Fe_{24}Al_3N_3$ | 0.75 | 0.6 | +2.0 | 19.0 |
| $Co_{64}Fe_{30}Al_3N_3$ | 1.00 | 0.9 | +9.0 | 21.0 |

TABLE 4

| Composition | $P_N$ (mTorr) | Hc (Oe) | $\lambda s$ ($\times 10^6$) | Bs (kG) |
|---|---|---|---|---|
| $Co_{85}Fe_{9.5}Ga_3N_{2.5}$ | 0.75 | 0.6 | 0.7 | 17.0 |
| $Co_{70}Fe_{13}Ga_4N_4$ | 1.50 | 0.5 | −1.5 | 18.0 |
| $Co_{81.5}Fe_{11}Si_4N_{3.5}$ | 1.00 | 0.7 | +0.9 | 18.0 |
| $Co_{79}Fe_{10}Si_{5.5}N_{5.5}$ | 1.50 | 0.8 | +0.7 | 16.5 |
| $Co_{86}Fe_8Ge_3N_3$ | 1.00 | 0.6 | +0.4 | 16.0 |
| $Co_{82.5}Fe_{11.5}Ge_3N_3$ | 1.00 | 0.8 | 0.9 | 16.5 |
| $Co_{83}Fe_{9.5}B_4N_{3.5}$ | 0.75 | 0.5 | 0.3 | 16.5 |
| $Co_{78}Fe_{12}B_6N_4$ | 1.20 | 0.9 | 1.3 | 18.0 |

EXAMPLE 6

Ferromagnetic films having a thickness of 0.3 μm or 4 μm were formed on Si substrates using a bipolar RF magnetron sputtering apparatus, by sputtering a Co-11.5 at %Fe-4 at %Al alloy target in the atmosphere of a mixture gas of Ar and $N_2$ under various total sputtering gas pressures. The sputtering conditions were as follows.

RF current density: 7.4 W/cm$^2$
Total sputtering gas pressure: 0.06–0.2 Pa
Nitrogen gas: 20%
Preliminary exhaustion: $2 \times 10^{-4}$ Pa or less The coercive force of each magnetic film was measured with a B-H loop tracer by applying a magnetic field of 4000 A/m to the film, and the saturation magnetic flux density of the same was measured by VSM.

Figure 14:
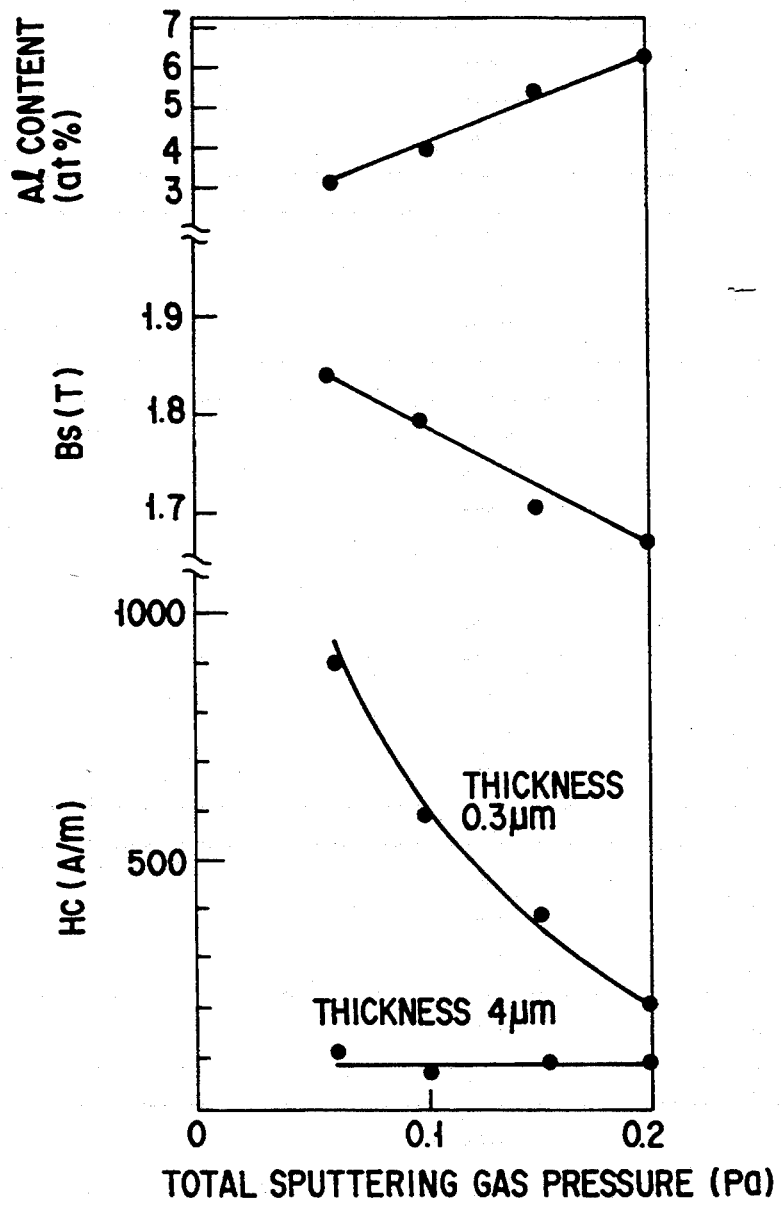
FIG. 14 is a graph showing a total sputtering gas pressure dependency of the coercive force Hc, saturation magnetic flux density Bs, and Al content of the ferromagnetic film formed in Example 6.

FIG. 14 shows a total sputtering gas pressure dependency of Hc, Bs, and Al content of the magnetic films.

As can be seen from FIG. 14, the higher the total sputtering gas pressure, the higher the Al content and the lower the saturation magnetic flux density, irrespective of whether the thickness of the film is 0.3 μm or 4 μm. Further, in the case of the film having a thickness of 0.3 μm, the higher the total sputtering gas pressure, the lower the coercive force. On the other hand, in the case of the film having a thickness of 4 μm, the coercive force is as low as approximately 80 A/m irrespective of the total sputtering gas pressure.

Then, a magnetic film having a lower Al content on the side of the outer surface than on the side of the substrate was formed as follows. That is, a magnetic film having a thickness of 4 μm was formed while the total sputtering gas pressure varied with the lapse of time to control the pressure to 0.2 Pa in the initial stage and to 0.06 Pa in the last stage. The obtained magnetic film entirely had good magnetic characteristics such as Hc of approximately 100 A/m and Bs of approximately 1.75 T. It is assumed that the portion of the film which is located within 0.3 μm or less from the substrate in the thickness direction has Hc of approximately 200 A/m, which means that the film thickness dependency of Hc is low.

EXAMPLE 7

Ferromagnetic films having a thickness of 0.5 μm or 4 μm were formed on Si substrates using a bipolar RF sputtering apparatus, by sputtering a $CoFe_{11.5}Al_4$ alloy target in the atmosphere of a mixture gas of Ar and $N_2$ under various nitrogen partial pressures. The sputtering conditions were as follows.
  RF current density: 5.1 W/cm$^2$
  Total sputtering gas pressure: 1.3 Pa
  Nitrogen partial pressure: 0.03–0.25 Pa
  Preliminary exhaustion: $1.3 \times 10^{-4}$ Pa or less FIG. 15 shows the nitrogen partial pressure dependency of Hc, Bs, and nitrogen content of the magnetic films. As can be seen from FIG. 15, the higher the nitrogen partial pressure, the higher the nitrogen content and the lower the saturation magnetic flux density, irrespective of whether the thickness of the film is 0.5 μm or 4 μm.

In the case of the film having a thickness of 0.5 μm, Hc is approximately 430 A/m when the nitrogen partial pressure is 0.033 Pa, and is minimum when the nitrogen partial pressure is 0.1–0.13 Pa. On the other hand, in the case of the film having a thickness of 4 μm, Hc is approximately 100 A/m irrespective of the nitrogen partial pressure, which means that the nitrogen partial pressure dependence of Hc of this film is lower than that of the film of 0.5 μm thick.

Then, a ferromagnetic film having a lower nitrogen content on the side of the outer surface than on the side of the substrate was formed in the following manner. That is, a ferromagnetic film having a thickness of 4 μm was produced by sputtering while the nitrogen partial pressure varied with the lapse of time to control the partial pressure to 0.13 Pa in the initial stage and to 0.033 Pa in the last stage. The obtained magnetic film entirely had good soft magnetic characteristics such as Hc of approximately 90 A/m and Bs of approximately 1.8 T. It is assumed that the portion of the film which is located within 0.5 μm or less from the substrate in the thickness direction has Hc of approximately 70 A/m, which means that the film thickness dependency of Hc is low.

EXAMPLE 8

A magnetic film having a thickness of 4 μm was formed on a Si substrate using an RF sputtering apparatus, by simultaneously sputtering a $Co_{90}Fe_{10}$ alloy target and an Al target in the atmosphere of a mixture gas of Ar and $N_2$. At this time, rf current density applied to the $Co_{90}Fe_{10}$ alloy target was maintained constant at 7.4 W/cm$^2$, while that applied to the Al target was reduced with the lapse of time to control it to 3.1 W/cm$^2$ in the initial stage of film formation and to 1.8 W/cm$^2$ in the last stage. Thus, the Al content in the film was higher on the side of the substrate than on the side of the outer surface. The sputtering conditions were as follows.
  RF current density applied to the $Co_{90}Fe_{10}$ alloy target: 7.4 W/cm$^2$
  RF current density applied to the Al target: 1.8–3.1 W/cm$^2$
  Total sputtering gas pressure: 1.3 Pa
  Nitrogen partial pressure: 0.26 Pa
  Preliminary exhaustion: $1.3 \times 10^{-4}$ Pa or less It was found that the obtained magnetic film entirely had Hc of approximately 70 A/m and Bs of approximately 1.8 T. It is assumed that the portion of the film within 0.2 μm from the substrate in the thickness direction has Hc of approximately 60 A/m, which means that the film thickness dependency of Hc is low.

EXAMPLE 9

Figure 16:
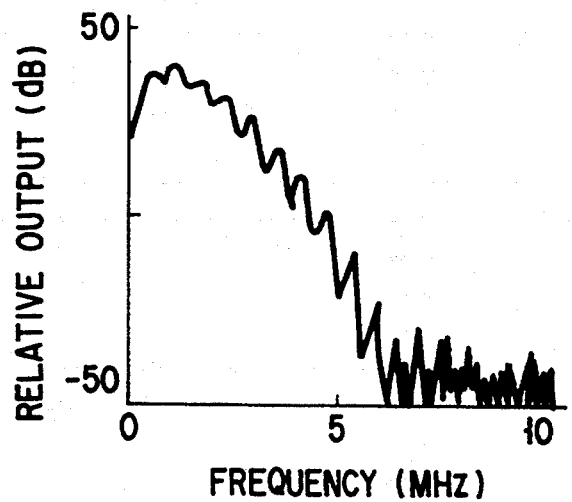
FIG. 16 is a chart showing the frequency characteristic of the output of a metal-in-gap head using a ferromagnetic film having a magnetically deteriorated initially-formed portion.

Ferromagnetic films having various thicknesses were formed on Si substrates using a bipolar RF sputtering apparatus, by sputtering a $CoFe_{11.5}Al_4$ alloy target or a $CoFe_{11}Al_8$ alloy target in the atmosphere of a mixture gas of Ar and $N_2$. The sputtering conditions were as follows.
  RF current density: 3.7 W/cm$^2$
  Total sputtering gas pressure: 1.3 Pa
  Nitrogen partial pressure: 0.26 Pa
  Preliminary exhaustion: $1.3 \times 10^{-4}$ Pa or less An MIG head was produced by forming a magnetic film on a predetermined substrate in a general manner, using the $CoFe_{11.5}Al_4$ alloy target. FIG. 16 shows the frequency characteristic of the output of the MIG head. As can be seen from FIG. 16, a ripple higher than 3–4 dB is generated so that the head can not be put into practice.

Figure 17:
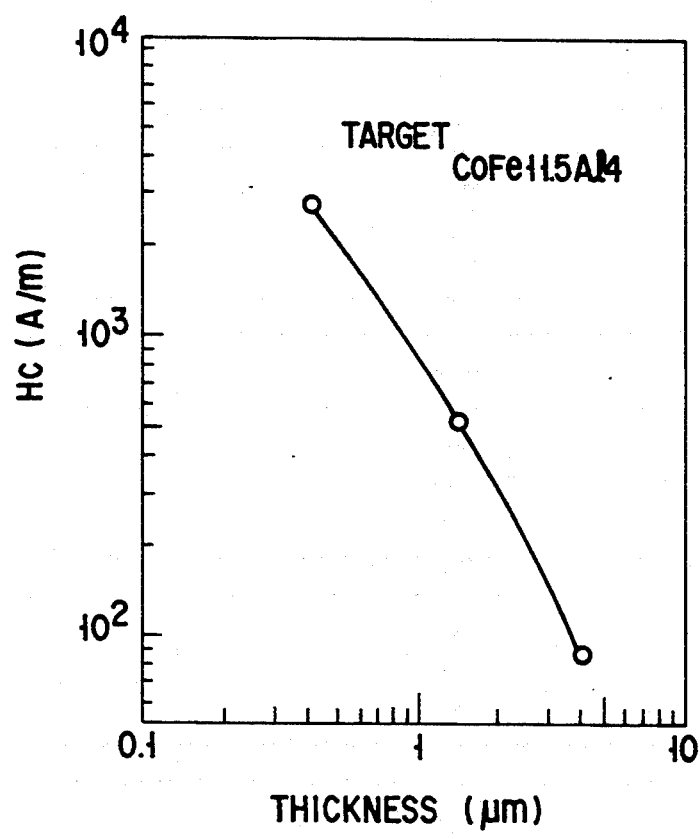
FIG. 17 is a graph showing a thickness dependency of the coercive force Hc of the ferromagnetic film formed by sputtering $CoFe_{11.5}Al_4$ target in Example 9.

The film thickness dependency of Hc was measured to examine the cause of the ripple. As is evident from FIG. 17, in the case of using the $CoFe_{11.5}Al_4$ alloy target, the thinner the magnetic film, the higher the coercive force. This means that the portion formed in the initial stage is magnetically deteriorated. It is assumed that the reason why the ripple occurs in the MIG head as shown in FIG. 16 is that the portion of the film which is formed in the initial stage and magnetically deteriorated serves as pseudo-magnetic gap between the substrate and the magnetic film.

FIG. 18 shows the thickness dependency of Hc and Bs of a magnetic film formed by sputtering the $CoFe_{11}Al_8$ alloy target. For ease of understanding, FIG. 18 also shows the thickness dependency of Bs of a magnetic film formed by sputtering the $CoFe_{11.5}Al_4$ alloy target. As is evident from the figure, the magnetic film formed using the $CoFe_{11}Al_8$ alloy target has low Hc irrespective of its thickness. However, this film has Bs of approximately 1.5 T lower than that of the film formed using the $CoFe_{11.5}Al_4$ alloy target, which is substantially equal to that of the conventional film.

Then, a magnetic film having an Al content lower on the side of the outer surface than on the side of the substrate was formed in the following manner. The magnetic film was formed on a Si substrate using an RF sputtering apparatus, by subsequently sputtering three targets of a $CoFe_{11}Al_8$ alloy, a $CoFe_{11}Al_6$ alloy, and a $CoFe_{11.5}Al_4$ alloy in the atmosphere of a mixture gas of Ar and $N_2$. As is shown in FIG. 19, the resultant magnetic film has a laminated structure of $CoFe_{10}Al_{3.5}$/$CoFe_{10}Al_{5.1}$/$CoFe_{10}Al_{7.2}$/Si, and having a total thickness of 3 μm.

The laminated film had entirely good characteristics such as Hc of approximately 80 A/m and Bs of approximately 1.7 T. These characteristics were not deteriorated even when the film was subjected to thermal treatment.

Further, magnetic film having a thickness of 0.5 μm or less, produced in the same manner as above, also had low Hc of 80 A/m, which means the film thickness dependency of Hc is low.

EXAMPLE 10

Ferromagnetic films were formed on Si substrates, which were respectively set various temperatures, using a bipolar RF magnetron sputtering apparatus, by sputtering a $CoFe_{11.5}Ta_5$ alloy target in the atmosphere of a mixture gas of Ar and $N_2$. The sputtering conditions were as follows.

Figure 20:
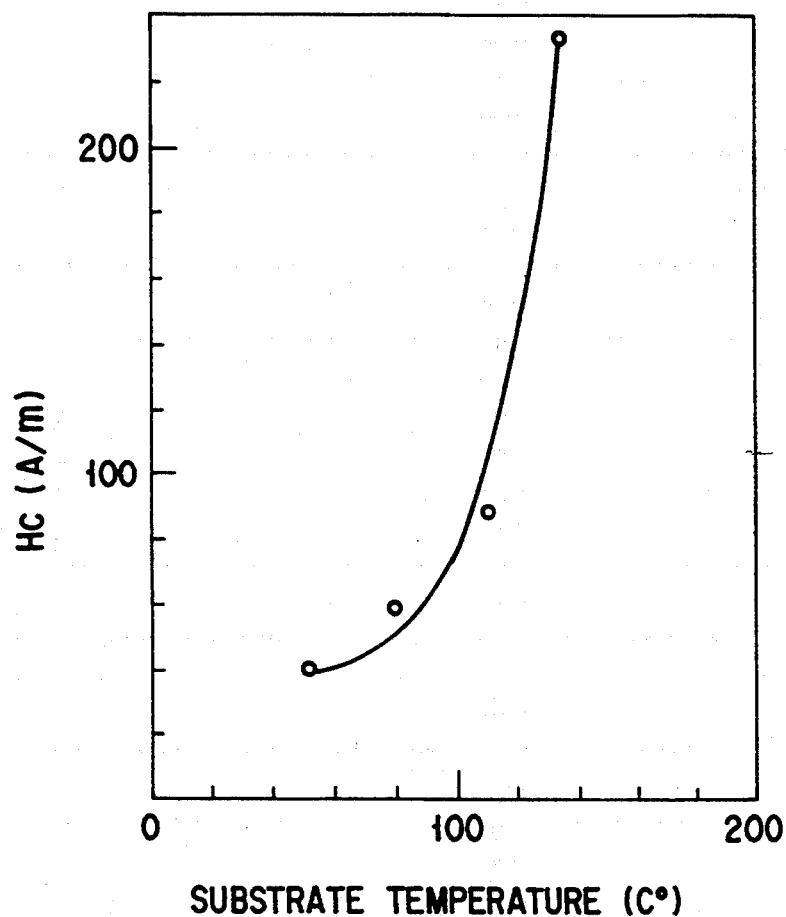
FIG. 20 is a graph showing a substrate temperature dependency of the coercive force Hc of a ferromagnetic film formed in Example 10.

RF current density: 7.4 W/cm$^2$
Total sputtering gas pressure: 0.2 Pa
Nitrogen gas: 10%
Preliminary exhaustion: $2 \times 10^{-4}$ Pa or less FIG. 20 shows the relationship between Hc of each of resultant magnetic films and the temperature of the corresponding substrate used at the time of film formation. As can be seen from FIG. 20, a magnetic film formed on a substrate having a low temperature of approximately 50° C. has low Hc of 40 A/m or less. Hc of the magnetic film increases according as the substrate temperature is raised. This seems because crystal grains are rendered fine when the film is formed on a substrate of a low temperature, while large crystal grains grow when the film is formed on a substrate of a high temperature.

At the time of forming, for example, a magnetic film for use in a VTR magnetic head, generally having a thickness of a few microns, the temperature of the substrate is raised in accordance with advance of film formation, though it is low in the initial stage. In this case, fine crystal grains are liable to grow in the initial stage, and large crystal grains are liable to grow in the later stage.

The third element Ta which is contained in the target used in this example serves as rendering crystal grains fine. However, if a large amount of Ta is contained through the entire film sufficient to restrain growth of crystal grains even in the later stage when the substrate has a high temperature, Bs of the entire magnetic film will greatly be reduced.

Figure 21:
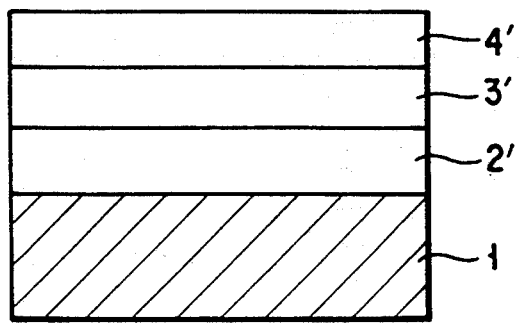
FIG. 21 is a cross sectional view showing the structure of another laminated ferromagnetic film according to the present invention.

Then, a magnetic film having a Ta content higher on the side of the outer surface than on the side of the substrate was formed in the following manner. The magnetic film was formed on a Si substrate using an RF sputtering apparatus, by subsequently sputtering three targets of a $CoFe_{11.5}Ta_5$ alloy, a $CoFe_{11}Ta_7$ alloy, and a $CoFe_{11}Ta_9$ alloy, in the atmosphere of a mixture gas of Ar and $N_2$. As is shown in FIG. 21, the magnetic film has a laminated structure of $CoFe_{10}Ta_8$/$CoFe_{10}Ta_6$/$CoFe_{10}Ta_5$/Si, and has a total thickness of 4 μm.

The resultant laminated film entirely had good characteristics such as Hc of approximately 40 A/m and Bs approximately 1.6 T. These characteristics were not deteriorated even when the film was subjected to thermal treatment.

Further, a magnetic film having a thickness of 0.5 μm or less, produced in the same manner as above, also had low Hc of 55 A/m, which means that the film thickness dependency of Hc is low.

Embodiments of a magnetic head to which the magnetic film according to the present invention is applied will be described below with reference to FIGS. 9 to 11.

Figure 9:
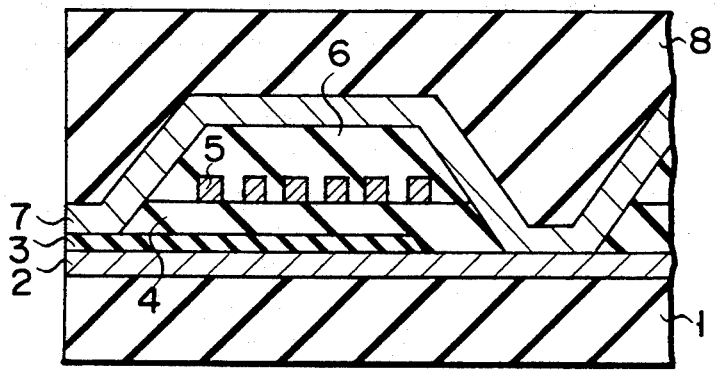
FIG. 9 is a sectional view showing a thin film magnetic head of a longitudinal recording type using the ferromagnetic film according to the present invention.

FIG. 9 is a sectional view showing a thin film magnetic head corresponding to a longitudinal recording type hard disk. Referring to FIG. 9, a ferromagnetic film 2 is stacked on a substrate 1, and an insulator 3 forming a predetermined gap and a first insulating layer 4 is stacked on the film 2. A coil 5 is wound on the first insulating layer 4, and a second insulating layer 6 is stacked to cover the coil 5. A ferromagnetic film 7 is formed on the surface of the insulating layer so as to be partially in contact with the ferromagnetic film 2, and the gap is formed between the ferromagnetic films 2 and 7 on the head front end side. A protective film 8 is formed on the ferromagnetic film 7. Since the ferromagnetic film of the present invention has a saturation magnetic flux density higher than that of a conventional ferromagnetic film (e.g., an NiFe film or Co-based amorphous film), recording can be sufficiently performed even for a medium having a high coercive force. As a result, high-density recording is realized.

Figure 10:
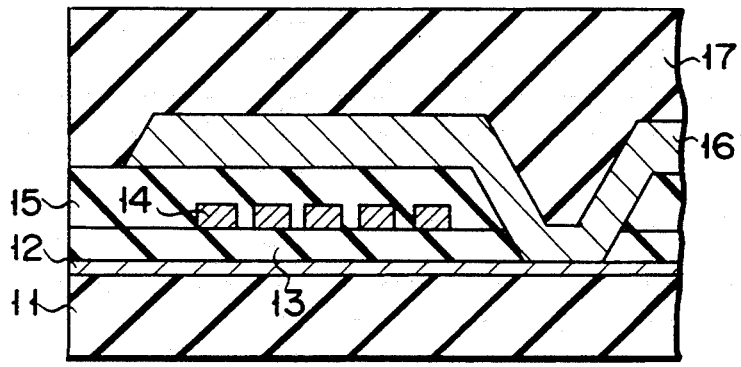
FIG. 10 is a sectional view showing a thin film magnetic head of a vertical recording type using the ferromagnetic film according to the present invention.

FIG. 10 is a sectional view showing a thin film magnetic head of a vertical recording type. Referring to FIG. 10, a main magnetic pole 12 consisting of the ferromagnetic film according to the present invention and a first insulating layer 13 are sequentially stacked on a substrate 11, a coil 14 is wound on the first insulating layer 13, and a second insulating layer 15 is stacked to cover the coil 14. A return path magnetic body 16 is formed on the surface of the insulating layer so as to be partially in contact with the main magnetic pole 12. A protective film 17 is formed on the return path magnetic body 16. Since the ferromagnetic film of the present invention used in the main magnetic pole 12 has a saturation magnetic flux density higher than that of a conventional ferromagnetic film (e.g., a Co-based amorphous film), the thickness of the main magnetic pole can be further decreased to realize high-density vertical magnetic recording with a high track recording density.

Figure 11:
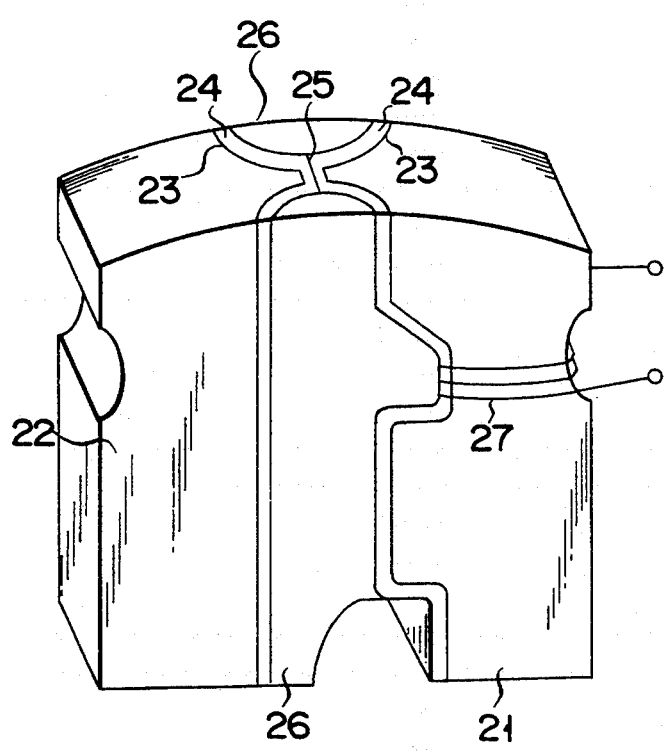
FIG. 11 is a perspective view showing a metal-in-gap head using the ferromagnetic film according to the present invention.

FIG. 11 is a perspective view showing a metal-in-gap head. Referring to FIG. 11, ferromagnetic films 24 according to the present invention are formed on opposing surfaces of a pair of ferrite cores 21 and 22 via interlayers 23. The interlayers 23 are used to enhance an adhesive force and to prevent mutual diffusion between the ferrite cores and the ferromagnetic films and preferably consist of Cr, $SiO_2$, or NiFe. A coil 27 is wound on the ferrite core 21. The ferrite cores 21 and 22 are welded to each other by glass 26 so as to form a gap 25 between the ferromagnetic films 24. Although a glass welding step is performed at a high temperature of 500° C. or more to manufacture this head, the ferromagnetic film of the present invention can be applied to the head since the film has a heat resistance of 500° C. or more.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A ferromagnetic film consisting of:
an alloy represented by the formula $$(Co_xFe_yT_z)_aN_b$$

wherein T represents at least one type of an atom selected from the group consisting of Al, B, Si, Ga, and Ge, x, y, and z represent at % and satisfy $66<x<94$, $5<y\leq24$, $1<z<10$, and $x+y+z=100$, and a and b represent at % and satisfy $85<a<99$, $1<b<15$, and $a+b+100$, said film being crystalline, and having a crystal structure at least partially consisting of an fcc phase; and wherein said film exhibits the following properties:

$$Hc \leq 1 \text{ Oe}; \lambda \leq 2 \times 10^{-6};$$

Bs of more than 15 kG; and a heat resistance of 500° C. or more.

2. A film according to claim 1, having a crystal structure mainly consisting of the fcc phase.

3. A film according to claim 2, having a crystal structure in which an fcc (111) or fcc (200) peak is strongest in X-ray diffraction.

4. A film according to claim 1, wherein y indicating an Fe content satisfies $5<y<16$.

5. A film according to claim 1, wherein z indicating a T component content satisfies $3 \leq z<10$.

6. A film according to claim 1, wherein a ratio of z indicating a T component content to b indicating an N content is 1:0.5 to 1.5.

* * * * *